United States Patent
Vasiliev et al.

[11] Patent Number: 6,155,450
[45] Date of Patent: Dec. 5, 2000

[54] COMPOSITE SHELL SHAPED AS A BODY OF REVOLUTION

[75] Inventors: Valery Vitalievich Vasiliev, Moscow; Alexandr Fedorovich Razin; Anatoly Ivanovich Ufimtsev, both of Moskovskaya obl.; Vladimir Alexandrovich Bunakov, Moscow, all of Russian Federation

[73] Assignees: McDonnell Douglas Corporation, Huntington Beach, Calif.; AO "Centr Perspektivnykh Razarabotok", Khutkovo, Russian Federation

[21] Appl. No.: 08/960,401

[22] Filed: Oct. 29, 1997

[30] Foreign Application Priority Data

Oct. 29, 1996 [RU] Russian Federation ............ 96121435

[51] Int. Cl.$^7$ ................................. B32B 1/08; B32B 5/02
[52] U.S. Cl. ......................... 220/589; 156/169; 156/170; 156/172; 156/173; 156/180; 220/589; 220/591; 220/646; 220/648; 428/36.3; 428/36.91
[58] Field of Search ............................... 428/36.3, 36.91; 156/169, 170, 172, 173, 180; 220/589, 591, 588, 646, 648

[56] References Cited

U.S. PATENT DOCUMENTS

| | | | |
|---|---|---|---|
| 3,083,864 | 4/1963 | Young | 220/83 |
| 3,300,354 | 1/1967 | Duft | 156/169 |
| 4,053,081 | 10/1977 | Minke | 220/3 |
| 4,137,354 | 1/1979 | Mayes, Jr. et al. | 428/116 |
| 4,278,485 | 7/1981 | Hamm et al. | 156/173 |
| 4,284,679 | 8/1981 | Blad et al. | 428/218 |
| 5,814,386 | 9/1998 | Vasiliev et al. | 428/36.3 |

FOREIGN PATENT DOCUMENTS

| | | |
|---|---|---|
| 0019598 | 5/1980 | European Pat. Off. . |
| 378611 | 4/1973 | U.S.S.R. . |
| 1046445A | 10/1983 | U.S.S.R. . |
| 1057651A | 11/1983 | U.S.S.R. . |
| 1076691A | 2/1984 | U.S.S.R. . |
| 458177A1 | 10/1991 | U.S.S.R. . |
| 533004A1 | 10/1991 | U.S.S.R. . |
| 532209 | 10/1995 | U.S.S.R. . |

*Primary Examiner*—Ellis Robinson
*Assistant Examiner*—Sandra M. Nolan
*Attorney, Agent, or Firm*—Alston & Bird LLP

[57] ABSTRACT

The invention relates as a whole to composite structures and may be used, in particular, in the manufacture of bodies or compartments of flying vehicles used in rocketry and aeronautics.

A composite shell shaped as a body of revolution comprises a load-bearing framework of a multilayer structure consisting of intersecting spiral and annular strips arranged at intervals and forming cross nodes and stiffening ribs therebetween, an outer load-bearing shell, fine-cellular layers consisting of spiral and annular strips therebetween, surrounding the stiffening ribs of the framework in the directions thereof, and having the width exceeding the width of the strips in the ribs and forming their bearing flanges. The spiral and annular strips of the framework and of the fine-cellular layers, and the outer load-bearing shell are made of unidirectional fibers and a polymer binder.

4 Claims, 3 Drawing Sheets

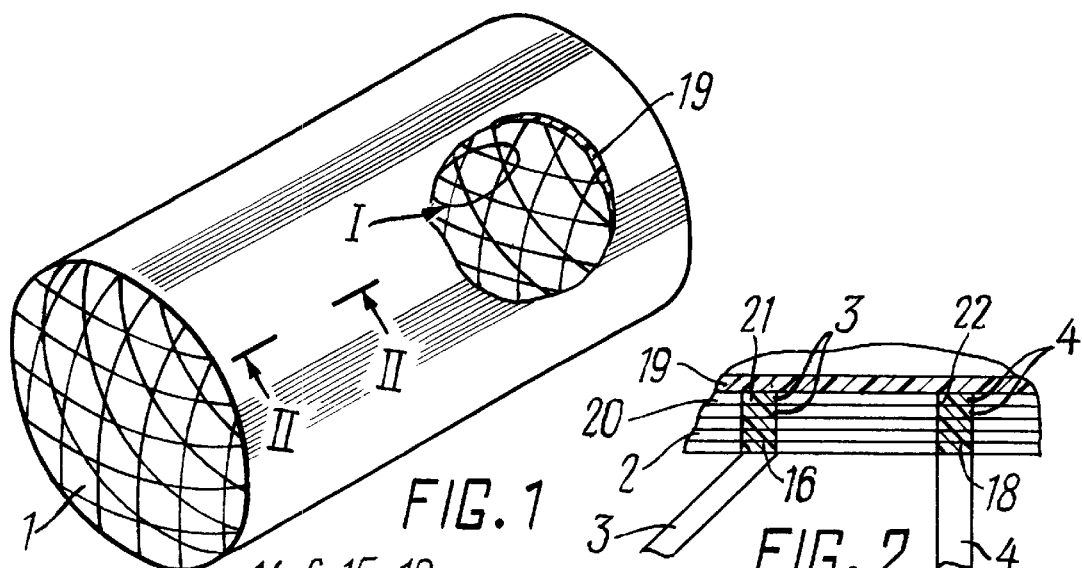
FIG. 1
FIG. 2
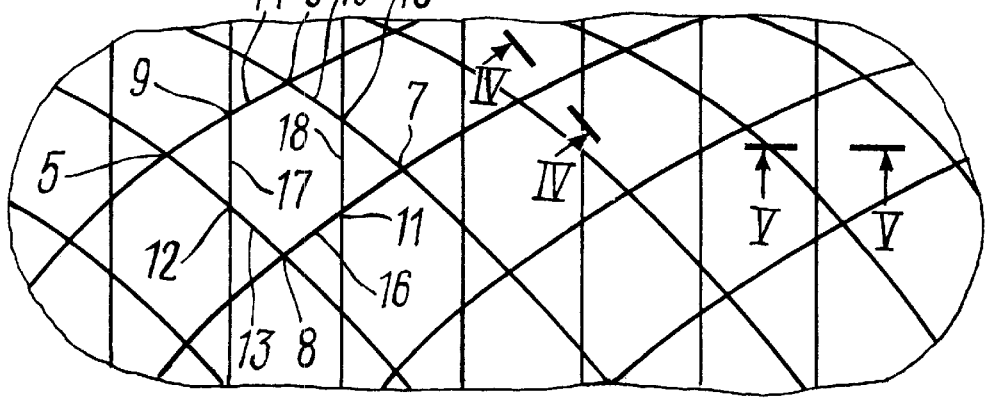
FIG. 3
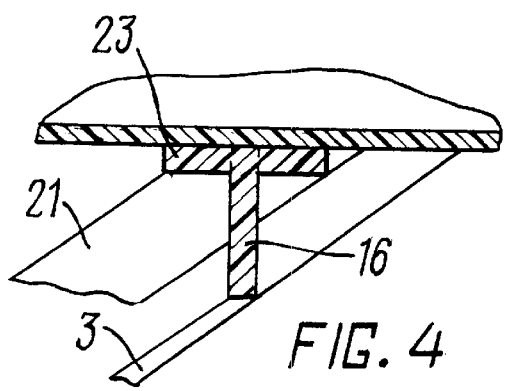
FIG. 4
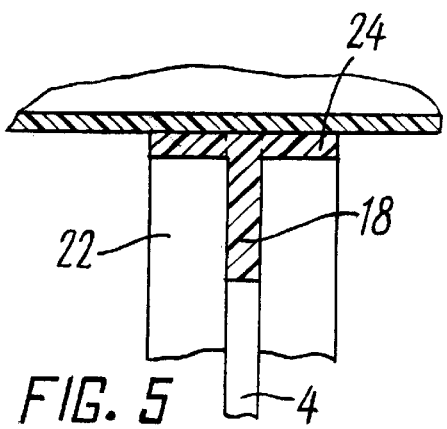
FIG. 5

COMPOSITE SHELL SHAPED AS A BODY OF REVOLUTION

FIELD OF THE INVENTION

The invention relates as a whole to composite structures and may be used, in particular, in the manufacture of bodies as compartments of flying vehicles used in rocketry or aeronautics.

Stringent requirements are imposed upon composite shells shaped as a body of revolution in what concerns their strength and reliability, and the products must have a minimum weight. However, when the weight is reduced, the thickness of the walls decreases and there arises a danger of premature destruction of the product because of reduction of its strength. Therefore, in the composite shells shaped as a body of revolution, in their weakened zones are introduced various reinforcements.

Known in the art is a composite shell shaped as a body of revolution, comprising a load-bearing framework of a cellular structure consisting of crisscross spiral and annular stripes (U.S. Pat. No. 3,083,864, cl. 220-83, 1963).

Known in the art is another composite shell shaped as a body of revolution, comprising a load-bearing framework of a cellular structure consisting of intersecting unidirectional fibers, and an outer load-bearing shell (U.S. Pat. No. 4,137,354, cl. 428-116, 1979).

However, the known shells have reduced rigidity and strength.

Such shells for ensuring reliable operation in the conditions of complicatedly stressed state with simultaneous compression, bending and torsion loads require additional strengthening and have increased weight.

Similar disadvantages appear in the shells comprising a cellular framework consisting of intersecting spiral reinforcing fibers arranged between the outer and inner load-bearing shells (U.S. Pat. No. 3,300,354, cl. 156-159, 1967).

In a composite shell (U.S. Pat. No. 4,284,679, cl. 428-218, 1981) comprising a load-bearing framework of a cellular structure, formed of layers repeating throughout the thickness of the wall and consisting of systems of crossing spiral and annular strips, made of unidirectional fibers, forming stiffening ribs and cross nodes; and an outer load-bearing shell, between the strips are provided interlayers of a binder, and the layers of the wall are reticular. To improve stability of the ribs (U.S. Pat. No. 4,278,485 cl. 156-173, 1981) in the cells between the ribs are introduced foam plastic inserts having edge formers of a composite material.

Most close by its technical essence and chosen as the prototype is a composite shell disclosed in U.S. Pat. No. 4,284,679, in which the composite shell, the intersecting spiral, and annular strips are concentrated in cross nodes of the spiral strips, that increases their structural depth and weakens relationship between the strips in the ribs, makes worse the quality and reliability of the construction, reduces the efficiency of its operation in the conditions of complicated stressed state.

BRIEF DESCRIPTION OF THE INVENTION

The main object of the present invention is to create a composite shell of such structure, in which would be eliminated the above-mentioned disadvantages.

A composite shell according to the present invention has improved rigidity, strength and stability.

The main object is achieved by changing the construction of a load-bearing framework of a cellular structure and its coupling or relationship with the outer load-bearing shell.

A composite shell comprises a load-bearing framework of a multilayer structure, formed of layers repeating throughout the thickness of its wall and consisting of systems of intersecting spiral and annular strips arranged at intervals and forming cross nodes and stiffening ribs therebetween and an outer load-bearing shell. The load-bearing framework and the loadbearing shell are made of unidirectional fibers bound by a polymer binder, said load-bearing framework being provided with fine-cellular layers of systems of intersecting spiral and annular strips of unidirectional fibers, or woven strips, or combinations thereof, which layers surround its stiffening ribs in the directions thereof. The strips of fine-cellular layers form bearing flanges of the ribs and are bound to the ribs and to outer load-bearing shell by a polymer binder, angles between the spiral ribs, opposite the annular ribs, are angles ~L preferably equal to 50–60°, and the spiral ribs between their intersection nodes are crossed by the annular ribs with an equal pitch along the length thereof. The annular ribs may adjoin the nodes of intersection of the spiral ribs.

The shell made in this way allows to ensure further improvement of the shells of such structures in the considered field. In the claimed shell the angles between the spiral ribs may be varied depending on the nature of the stressed deformed state. During the action of compressive loads, most characteristic angles between the spiral ribs, opposite the angular ribs, are the angles, preferably equal to 50–60°. The annular ribs intersect the spiral ribs between the nodes of their intersection, that allows to reduce the structural depth at the points of intersection of the spiral strips without the annular strips and seal the layers of strips in the spiral and annular ribs themselves.

Manufacture of the claimed structure becomes more adaptable to streamlined production and ensures high quality of manufacture of products. The efficiency of the shells increases to a greater extent, if intersection of the annular ribs with the spiral ribs between the intersection nodes will be made with an equal pitch along the length thereof, that allows to improve stability of the spiral ribs during compression. Besides, the nodes of intersection of the annular ribs with the spiral ribs may adjoin the nodes of intersection of the spiral ribs, that allows to increase the load-carrying capacity of the nodes of intersection of the spiral ribs, reduce concentration of stresses in these zones and improve their reliability when the ribs are compressed and also when the layers are shifted in the ribs.

Together with this, the load-bearing framework of a cellular structure through continuous spiral and annular ribs owing to the fine-cellular layers having wider strips than in the ribs of the framework, create a reliable support of the ribs against the outer load-bearing shell and cooperation therewith when the shell is subjected to the action of compressive loads, that is very important for ensuring its stability. The strips of the layers of fine-cellular structure may be arranged symmetrically relative to the spiral and annular ribs, may be displaced, for example, when the annular stiffening ribs adjoin the nodes of intersections of the spiral ribs, that allows to vary geometrical parameters of the structure of the load-bearing framework and of the shell as a whole to achieve a minimum weight with maximum possible increased stiffness and strength parameters.

Said distinguishing essential features are novel, since their use in the prior art analogs and prototype was not revealed, that allows to characterize the claimed composite shell as corresponding to criterion "novelty".

The unified combination of new essential features and the common known essential features allows to solve the problem raised and achieve a new technical result in improving the stiffness, strength and reliability of the structure which is highly adaptable to production, that allows to characterize the claimed technical solution by essential distinctions distinguishing it from the prior art, analogs and prototypes. The new technical solution is a result of scientific research and research and development work and creative contribution, directed to further improvement of composite shells in this field without using any known standard or design solutions, recommendations and by virtue of its originality corresponds to the criterion "inventive level".

BRIEF DESCRIPTION OF THE DRAWINGS

FIG. 1 is a general view of a composite shell;

FIG. 2 is a sectional view taken along line II—II of FIG. 1;

FIG. 3 shows the structure of arrangement of spiral and annular ribs in a load-bearing framework;

FIG. 4 is a cross-sectional view taken along line IV—IV of FIG. 3;

FIG. 5 is a cross-sectional view taken along line V—V of FIG. 3;

DETAILED DESCRIPTION OF THE INVENTION

Figure 6:
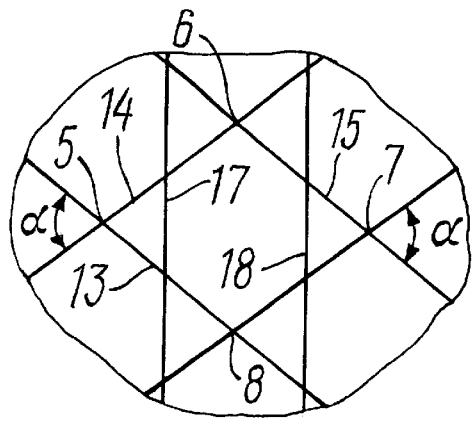
FIG. 6 shows intersection of spiral ribs at angle α.
Figure 7:
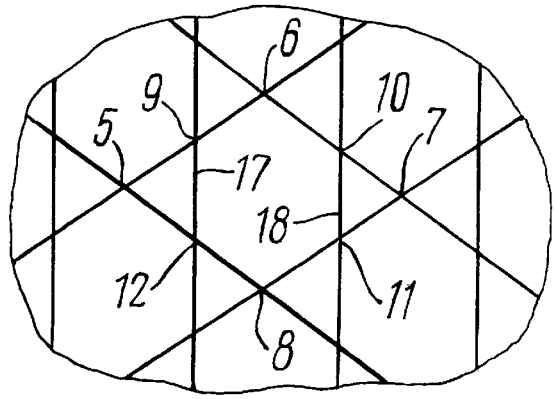
FIG. 7 shows arrangement of nodes of intersection of annular ribs with spiral ribs between nodes of intersection of spiral ribs at equal pitch along the length thereof.
Figure 8:
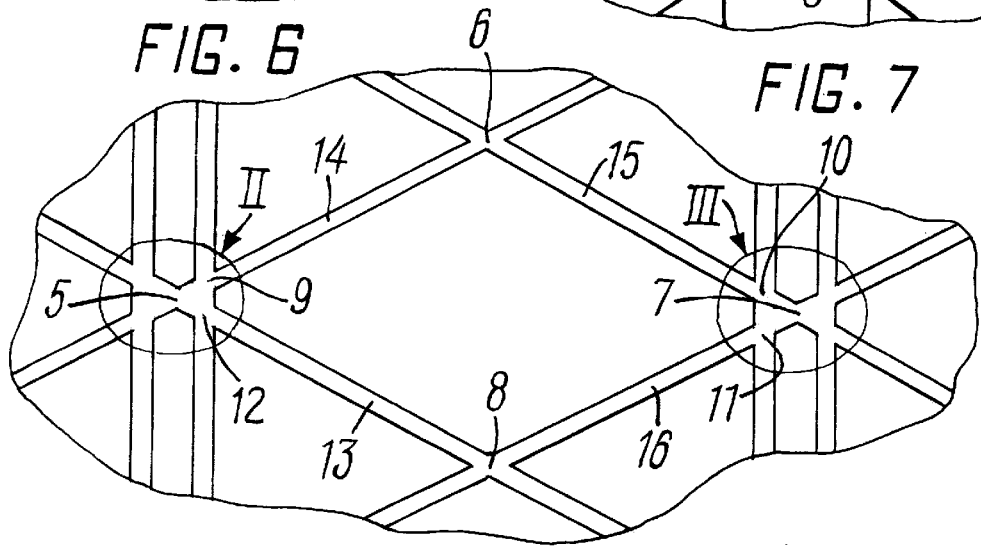
FIG. 8 shows annular ribs adjoining from two side nodes of intersection of spiral ribs.
Figure 9:
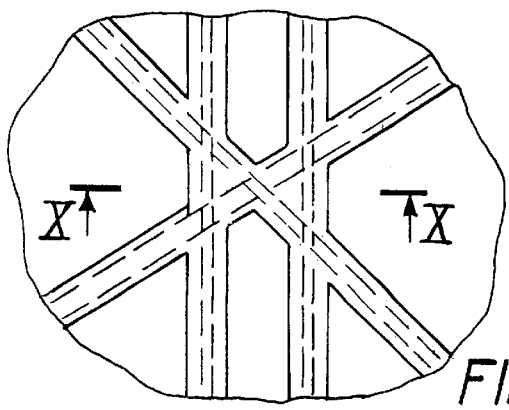
FIG. 9 shows annular ribs adjoining from two sides nodes of intersection of spiral ribs, when the annular ribs are arranged symmetrically with respect to flanges.
Figure 10:
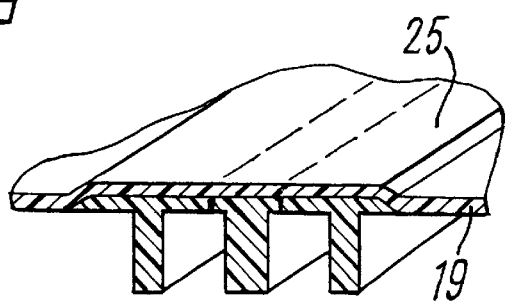
FIG. 10 is a sectional view taken along line X—X of FIG. 9.
Figure 11:
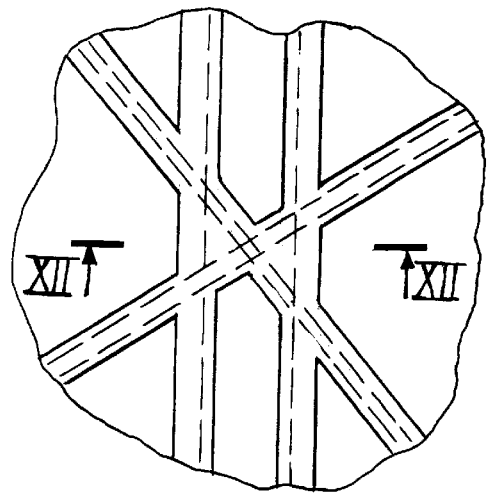
FIG. 11 shows annular ribs adjoining from two sides node of intersection of spiral ribs, when the flanges are arranged asymmetrically.
Figure 12:
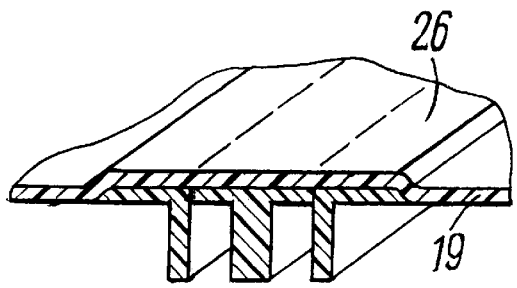
FIG. 12 is a sectional view taken along line XII—XII of FIG. 11.
Figure 13:
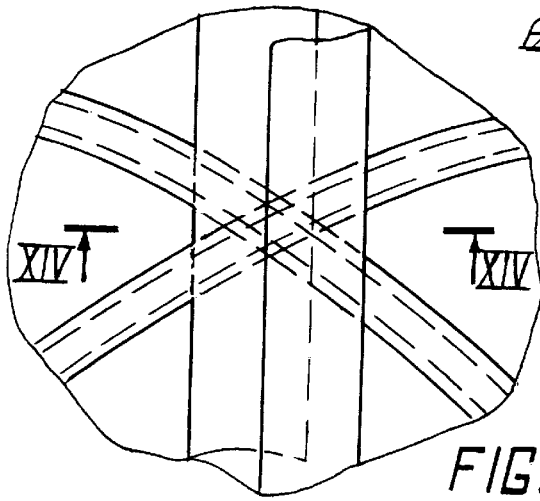
FIG. 13 shows annular ribs adjoining from two sides node of intersection of spiral ribs, and layers in the flanges.
Figure 14:
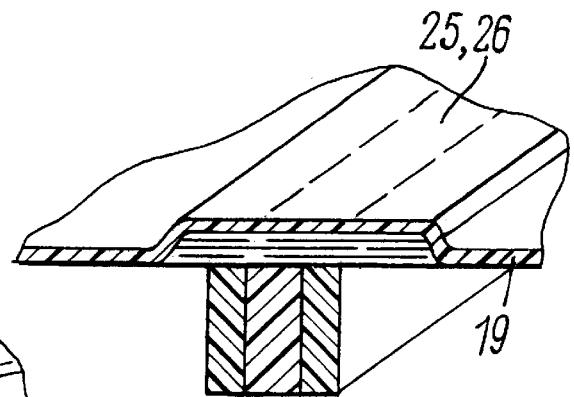
FIG. 14 is a sectional view taken along line XIV—XIV of FIG. 13.

A composite shell comprises a load-bearing framework 1 of a multilayer structure made of layers 2 repeating throughout the thickness of its wall and consisting of systems of crossing spiral and annular strips 3 and 4, respectively, arranged at intervals and forming cross nodes 5–8 and 9–12 and spiral and annular stiffening ribs 15,16 and 17,18 therebetween, an outer load-bearing shell 19, which are made of unidirectional fibers bound by a polymer binder. The load-bearing framework 1 is provided with fine-cellular layers 20, surrounding its stiffening ribs 13–16 and 17,18 in their directions, and consisting of systems of intersecting spiral and annular strips 21 and 22, respectively, of unidirectional fibers, or woven strips, or combinations thereof, having the width exceeding the width of the strips 3,4 in the ribs and forming their bearing flanges 23,24 bonded to them and to the outer load-bearing shell 19 by polymer binders. Angles α between the spiral ribs 13,14 and 15,16, opposite the annular ribs 17,18, are preferably the range of 50–60°. The spiral ribs 13,14 and 15,16 between the nodes of their intersection 5,6 and 7,8 are crossed by the annular ribs 17,18 at equal pitch along the length thereof (FIG. 7) to form the nodes 9–12. The nodes of intersection 9–12 of the annular ribs 17,18 with the spiral ribs 13–16 may adjoin from two sides the intersection nodes 5,7 of the spiral ribs 13,14 and 15,16 (FIG. 8). The fine-cellular layers 20 of the systems of intersecting spiral and annular strips 21,22 in the directions of the ribs 13–16 and 17,18 may be flush with the outer surface of the framework 1 or project above said framework in the form of a plurality of intersecting corrugations or crimps 25,26 of the outer load-bearing shell 19 (FIG. 10, FIG. 12, FIG. 14). Manufacturing a composite shell includes: applying and securing to the surface of a mandrel flexible plates (not shown) having a net of intersecting grooves for strips of fibers for shaping therein spiral and annular stiffening ribs; winding the framework 1 of a cellular structure of respective strips impregnated with a polymer binder; applying to the spiral and annular ribs 13–16 and 17,18 in the directions thereof wider strips 21,22 to form of said strips the layers 20; applying onto them annular strips to form the outer load-bearing shell 19; polymerization of a binder; removing the mandrel, the shaping flexible plates and obtaining the composite shell.

When the composite shell is loaded with compressive loads, the spiral and annular ribs 15–16 and 17,18, the fine-cellular layers 20 and the outer load-bearing shell 19 work together within the permissible stressed deformed state owing to efficiently involving into work the load-bearing framework 1, the outer load-bearing shell 19 through the reinforcing flanges 23,24, and ensuring take up of increased critical loads without breakdown of the structure.

Composite shells manufactured with the use of a new technical solution, were subjected to tests for checking their efficiency, the test results were positive.

The new composite shell is industrially reproducible and gives a new technical result.

The claimed technical solution allows to obtain high quality products for body elements of flying vehicles.

Thus, the shell described above in the claimed embodiments is novel and efficient in comparison with the prior art.

The scope of the claimed invention should be understood wider than that concrete embodiment shown in the specification, the claims and the drawings. It should be kept in mind that the form of the invention represents only possible, preferable embodiments thereof, may be used various embodiments of the invention relating to the shape, dimensions and arrangement of individual elements, if all this is within the scope of the invention set forth in the claims.

Besides, the claimed invention is not limited in its use only to the shells for flying vehicles and may be also used in other fields wherein it is required to use composite shells shaped as a body of revolution and having improved strength and reliability and other properties described in the materials of this application.

What is claimed is:

1. A composite shell structure shaped as a body of revolution, comprising:

a load-bearing framework having a wall made of layers of crossing spiral and annular strips of predetermined width each formed of unidirectional fibers bound by a polymer binder, the spiral strips being wrapped spirally about an axis of the load-bearing framework along a plurality of spiral paths spaced apart along the load-bearing framework and the annular strips being wrapped annularly about the axis of the load-bearing framework along a plurality of annular paths spaced apart along the load-bearing framework and crossing the spiral paths so as to form cross nodes where the spiral and annular strips cross one another and spiral and annular stiffening ribs extending between the cross nodes, each stiffening rib having a width at an outer surface of the load-bearing framework which is defined by the width of the strips forming said rib;

spiral and annular bearing flanges bound to the outer surfaces of the spiral and annular stiffening ribs, respectively, the bearing flanges being formed of layers of fine-cellular spiral and annular strips having predetermined widths exceeding the widths of the stiffening ribs, the fine-cellular spiral and annular strips being wrapped along the spiral and annular paths of the stiffening ribs so as to cross one another at the cross nodes, the fine-cellular strips being formed of at least one of unidirectional fibers and woven strips; and an outer load-bearing shell bound by a polymer binder to outer surfaces of the bearing flanges.

2. A shell according to claim 1, wherein the spiral ribs extend about the axis of the load-bearing framework at two different spiral angles and cross one another so as to define angles between the spiral ribs within the range of 50 to 60°.

3. A shell according to claim 1, wherein the cross nodes of the spiral ribs with the annular ribs are spaced at equal intervals along the spiral path of the spiral ribs.

4. A shell according to claim 1, wherein the spiral ribs extend about the load-bearing framework at two different spiral angles and are adjoined at cross nodes, and wherein the annular ribs include annular ribs adjoined to the cross nodes of the spiral ribs on one side thereof and annular ribs adjoined to the cross nodes of the spiral ribs on an opposite side thereof.

* * * * *